(12) United States Patent
Park et al.

(10) Patent No.: US 9,807,400 B2
(45) Date of Patent: Oct. 31, 2017

(54) IMAGE PROCESSING METHOD AND IMAGE PROCESSING APPARATUS

(71) Applicant: Samsung Electronics Co., Ltd., Suwon-si (KR)

(72) Inventors: Jeongae Park, Seoul (KR); Sunmin Kwon, Seoul (KR); Kwontaek Kwon, Hwaseong-si (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 51 days.

(21) Appl. No.: 15/066,571

(22) Filed: Mar. 10, 2016

(65) Prior Publication Data

US 2017/0078677 A1 Mar. 16, 2017

(30) Foreign Application Priority Data

Sep. 10, 2015 (KR) .......................... 10-2015-0128570

(51) Int. Cl.
| | |
|---|---|
| G06K 9/36 | (2006.01) |
| H04N 19/184 | (2014.01) |
| H04N 19/182 | (2014.01) |
| H04N 19/176 | (2014.01) |

(52) U.S. Cl.
CPC ......... *H04N 19/184* (2014.11); *H04N 19/176* (2014.11); *H04N 19/182* (2014.11)

(58) Field of Classification Search
CPC ...... H04N 19/176; H04N 19/61; H04N 19/60; H04N 21/234318
USPC ........ 382/233, 235, 239, 243, 244; 358/539, 358/426.03, 426.04
See application file for complete search history.

(56) References Cited

U.S. PATENT DOCUMENTS

| | | | | |
|---|---|---|---|---|
| 5,892,847 A * | 4/1999 | Johnson | ................. | H04N 19/30 375/E7.04 |
| 6,453,073 B2 * | 9/2002 | Johnson | ................. | H04N 19/30 369/124.06 |
| 6,990,151 B2 * | 1/2006 | Kim | ....................... | H03M 7/30 348/E5.067 |
| 8,107,534 B2 | 1/2012 | Ikeda | | |
| 8,390,698 B2 * | 3/2013 | Shimizu | ................ | H04N 5/145 348/154 |
| 8,502,534 B2 * | 8/2013 | Lai | ..................... | G01R 33/5611 324/307 |
| 8,687,693 B2 * | 4/2014 | Orlick | ................ | H04N 19/105 375/240.12 |

(Continued)

FOREIGN PATENT DOCUMENTS

| | | |
|---|---|---|
| JP | 6-319124 A | 11/1994 |
| JP | 5294767 B2 | 9/2013 |

(Continued)

*Primary Examiner* — Yosef Kassa

(57) ABSTRACT

An image processing method includes receiving a bitstream comprising a first encoding unit and a second encoding unit; acquiring from the bitstream a reference value for decoding of the first coding unit, a weight value for performing interpolation using the reference value to determine one or more sample values, and an index indicating one of the one or more sample values; decoding the first encoding unit using the index and a result of interpolation performed using the reference value and the weight value; and decoding the second encoding unit from the bitstream using the interpolation result used in the decoding of the first encoding unit.

27 Claims, 9 Drawing Sheets

(56) References Cited

U.S. PATENT DOCUMENTS 8,912,931 B2 12/2014 Cho
2015/0131919 A1 5/2015 Dewangan et al.

FOREIGN PATENT DOCUMENTS

KR 10-1401964 B1 5/2014
KR 10-1421984 B1 7/2014

* cited by examiner

FIG. 6

| RED REFERENCE VALUE 1 (4BITS) | RED REFERENCE VALUE 2 (4BITS) | GREEN REFERENCE VALUE 1 (4BITS) | GREEN REFERENCE VALUE 2 (4BITS) | BLUE REFERENCE VALUE 1 (4BITS) | BLUE REFERENCE VALUE 2 (4BITS) | WEIGHT VALUE 1 (3BITS) | WEIGHT VALUE 2 (3BITS) | CONTROL BITS (2BITS) | INDEX (32BITS) |
|---|---|---|---|---|---|---|---|---|---|
| 610 | 620 | 630 | 640 | 650 | 660 | 670 | 680 | 690 | 695 |

IMAGE PROCESSING METHOD AND IMAGE PROCESSING APPARATUS

CROSS-REFERENCE TO RELATED APPLICATION(S)

This application claims the benefit under 35 USC 119(a) of Korean Patent Application No. 10-2015-0128570 filed on Sep. 10, 2015, in the Korean Intellectual Property Office, the entire disclosure of which is incorporated herein by reference for all purposes.

BACKGROUND

1. Field

This application relates to an image processing method and an image processing apparatus.

2. Description of Related Art

With the development and popularization of hardware capable of reproducing and storing video content of high resolution or high image quality, it has become increasingly necessary to provide a method of efficiently encoding or decoding the video content of high resolution or high image quality.

Encoding or decoding is performed to reduce an amount data by using image prediction based on the fact that video images are highly correlated with each other temporally and spatially. In image prediction, image information is recorded using a temporal or spatial distance between images, a prediction error, or other parameters to predict a current image based on surrounding images.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an image processing method includes receiving a bitstream including a first encoding unit and a second encoding unit; acquiring from the bitstream a reference value for decoding of the first coding unit, a weight value for performing interpolation using the reference value to determine one or more sample values, and an index indicating one of the one or more sample values; decoding the first encoding unit using the index and a result of interpolation performed using the reference value and the weight value; and decoding the second encoding unit from the bitstream using the interpolation result used in the decoding of the first encoding unit.

The decoding of the second encoding unit from the bitstream may include comparing the reference value, the weight value, and the index of the first encoding unit with a reference value, a weight value, and an index of the second encoding unit; and decoding the second encoding unit from the bitstream using the interpolation result based on a result of the comparing.

The decoding of the second encoding unit from the bitstream using the interpolation result based on the result of the comparing may include determining a result of the decoding of the first encoding unit to be a result of decoding of the second encoding unit in response to the result of the comparing being that the reference value, the weight value, and the index of the first encoding unit are identical to the reference value, the weight value, and the index of the second encoding unit.

The decoding of the second encoding unit from the bitstream using the interpolation result based on the result of the comparing may include decoding the second encoding unit using the one or more sample values and the index of the second encoding unit in response to the result of the comparing being that the reference value and the weight value of the first encoding unit are respectively identical to the reference value and the weight value of the second encoding unit, and the index of the first encoding unit is different from the index of the second encoding unit.

The decoding of the second encoding unit from the bitstream using the interpolation result based on the result of the comparing may include determining a reference difference value that is a difference value between the reference value of the first encoding unit and the reference value of the second encoding unit and a weight difference value that is a difference value between the weight value of the first encoding unit and the weight value of the second encoding unit in response to the result of the comparing being that the reference value and the weight value of the first encoding unit are not respectively identical to the reference value and the weight value of the second encoding unit; and decoding the second encoding unit using the reference difference value and the weight difference value.

The decoding of the second encoding unit using the reference difference value and the weight difference value may include acquiring a reference calculation result that is a calculation result using the reference difference value and a weight calculation result that is a calculation result using the weight difference value; and decoding the second encoding unit using the interpolation result, the reference calculation result, and the weight calculation result.

The decoding of the second encoding unit from the bitstream using the interpolation result based on the result of the comparing may include acquiring a result of calculation for portions in which the reference value and the weight value of the first encoding unit are not respectively identical to the reference value and the weight value of the second encoding unit in response to the result of the comparing being that the reference value and the weight value of the first encoding unit are not respectively identical to the reference value and the weight value of the second encoding unit; and decoding the second encoding unit using the acquired result of calculation.

The decoding of the second encoding unit from the bitstream may include determining whether the first encoding unit is identical to the second encoding unit by comparing first tag information indicating the first encoding unit with second tag information indicating the second encoding unit; and determining a result of the decoding of the first encoding unit to be a result of decoding of the second encoding unit in response to a result of the determining being that the first encoding unit is identical to the second encoding unit.

Each of the first encoding unit and the second encoding unit may be a pixel, a block, or a frame.

Each of the first encoding unit and the second encoding unit may be encoded according to an Ericsson texture Compression (ETC) scheme.

In another general aspect, a non-transitory computer-readable storage medium stores a instructions for causing computing hardware to perform the method described above.

In another general aspect, an image processing apparatus includes a receiver configured to receive a bitstream including a first encoding unit and a second encoding unit; and a decoder configured to acquire from the bitstream a reference value for decoding of the first coding unit, a weight value for performing interpolation using the reference value to determine one or more sample values, and an index indicating one of the one or more sample values; decode the first encoding unit using the index and a result of interpolation performed using the reference value and the weight value; and decode the second encoding unit from the bitstream using the interpolation result used in the decoding of the first encoding unit.

The decoder may be further configured to compare the reference value, the weight value, and the index of the first encoding unit with a reference value, a weight value, and an index of the second encoding unit; and decode the second encoding unit from the bitstream using the interpolation result based on a result of the comparing.

The decoder may be further configured to determine a result of the decoding of the first encoding unit to be a result of decoding of the second encoding unit in response to the result of the comparing being that the reference value, the weight value, and the index of the first encoding unit are identical to the reference value, the weight value, and the index of the second encoding unit.

The decoder may be further configured to decode the second encoding unit using the one or more sample values and the index of the second encoding unit in response to the result of the comparing being that the reference value and the weight value of the first encoding unit are respectively identical to the reference value and the weight value of the second encoding unit, and the index of the first encoding unit is different from the index of the second encoding unit.

The decoder may be further configured to determine a reference difference value that is a difference value between the reference value of the first encoding unit and the reference value of the second encoding unit and a weight difference value that is a difference value between the weight value of the first encoding unit and the weight value of the second encoding unit in response to the result of the comparing being that the reference value and the weight value of the first encoding unit are not respectively identical to the reference value and the weight value of the second encoding unit; and decode the second encoding unit using the reference difference value and the weight difference value.

The decoder may be further configured to acquire a reference calculation result that is a calculation result using the reference difference value, and a weight calculation result that is a calculation result using the weight difference value; and decode the second encoding unit using the interpolation result, the reference calculation result, and the weight calculation result.

The decoder may be further configured to determine whether the first encoding unit is identical to the second encoding unit by comparing first tag information indicating the first encoding unit with second tag information indicating the second encoding unit; and determine a result of the decoding of the first encoding unit to be a result of decoding of the second encoding unit in response to a result of the determining being that the first encoding unit is identical to the second encoding unit.

Each of the first encoding unit and the second encoding unit may be a pixel, a block, or a frame.

Each of the first encoding unit and the second encoding unit may be encoded according to an Ericsson Texture Compression (ETC) scheme.

In another general aspect, an image processing apparatus includes a receiver configured to receive a bitstream including a first encoding unit and a second encoding unit; and a decoder configured to acquire from the bitstream first parameters for decoding the first encoding unit; decode the first encoding unit by using some of the parameters to obtain an interim decoding result, and using another one of the parameters to obtain a final decoding result; and decode the second encoding unit using the interim decoding result of the first encoding unit or the final decoding result of the first encoding unit.

The decoder may be further configured to acquire from the bitstream second parameters for decoding the second encoding unit; determine whether the first parameters are identical to the second parameters; and decode the second encoding unit using the interim decoding result of the first encoding unit or the final decoding result of the first encoding unit in response to a result of the determining.

The decoder may be further configured to determine the final decoding result of the first encoding unit to be a final decoding result of the second encoding unit in response to a result of the determining being that the first parameters are identical to the second parameters.

The decoder may be further configured to decode the second encoding unit using the interim decoding result of the first encoding unit and one of the parameters of the second encoding unit in response to a result of the determining being that some of the first parameters are identical to some of the second parameter, and one of the first parameters is not equal to one of the second parameters.

The first parameters may include a first reference value, a first weight value, and a first index; the second parameters may include a second reference value, a second weight value, and a second index; the interim result of the first encoding unit may be an interpolation result of the first encoding unit obtained by performing interpolation using the first reference value and the first weight value; and the decoder may be further configured to decode the second encoding unit using the interpolation result of the first encoding unit and the second index in response to the result of the determining being that the first reference value is equal to the second reference value, the first weight value is equal to the second weight value, and the first index is not equal to the second index.

The interpolation result may include a plurality of samples; the first index may indicate one of the samples, and the second index may indicate another one of the samples; the sample indicated by the first index may be the final decoding result of the first encoding unit; and the sample indicated by the second index may be a final decoding result of the second encoding unit.

The first parameters may include a first reference value, a first weight value, and a first index; the second parameters may include a second reference value, a second weight value, and a second index; the interim result of the first encoding unit may be an interpolation result of the first encoding unit obtained by performing interpolation using the first reference value and the first weight value; and the decoder may be further configured to decode the second encoding unit using the second index and most significant bits of the interpolation result of the first encoding unit combined with a calculation result of least significant bits of the second reference value and least significant bits of the second weight value in response to the result of the determining being that most significant bits of the first reference value are equal to most significant bits of the second reference value, least significant bits of the first reference value are not equal to the least significant bits of the second reference value, most significant bits of the first weight value are equal to most significant bits of the second weight value, least significant bits of the first weight value are not equal to the least significant bits of the second weight value, and the first index is not equal to the second index.

Other features and aspects will be apparent from the following detailed description, the drawings, and the claims.

BRIEF DESCRIPTION OF THE DRAWINGS

FIG. 6 is a diagram illustrating another example of a bitstream received by an image processing apparatus.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

As used herein, the term "and/or" includes any and all combinations of one or more of the listed items.

The terms "comprises", "includes", and "has" used herein specify the presence of stated elements, but do not preclude the presence or addition of other elements, unless stated otherwise.

Although the terms "first", "second", "third", etc., may be used herein to describe various elements, these elements are not to be limited by these terms. Rather, these terms are only used to distinguish one element from another.

Figure 1:
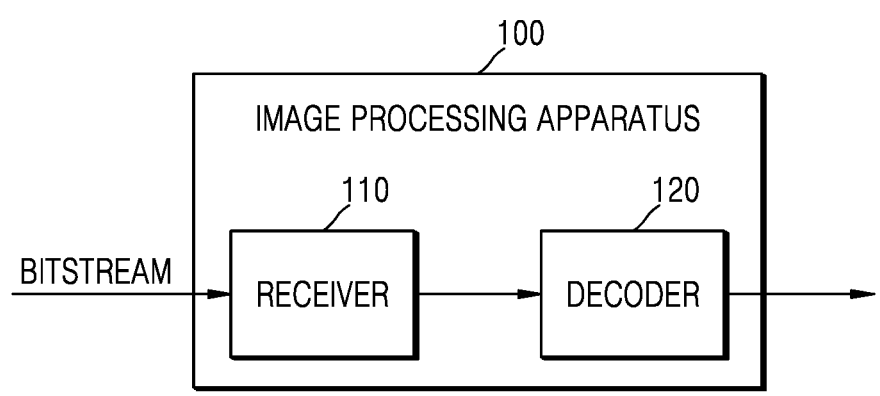
FIG. 1 is a block diagram illustrating an example of an image processing apparatus.

FIG. 1 is a block diagram illustrating an example of an image processing apparatus 100.

Referring to FIG. 1, the image processing apparatus 100 includes a receiver 110 and a decoder 120. However, this is merely an example, and the image processing apparatus 100 may be implemented by a larger or smaller number of elements than the number of elements illustrated in FIG. 1.

The receiver 110 receives a bitstream. For example, the receiver 110 receives a bitstream from outside the image processing apparatus 100 in a wired manner or a wireless manner.

The bitstream includes a first encoding unit and a second encoding unit. For example, data of the first encoding unit and the second encoding unit of a plurality of encoding units are included in the bitstream.

The encoding unit may be a pixel, a block, or a frame. In example, the encoding unit is encoded according to an Ericsson Texture Compression (ETC) scheme. In another example, the encoding unit is compressed according to a block compression scheme. In another example, the encoding unit is compressed according to an Ericsson Alpha Compression (EAC) scheme or an Adaptive Scalable Texture Compression (ASTC) scheme.

Also, the image processing apparatus 100 processes a compressed image. For example, the image processing apparatus 100 processes data encoded according to the ETC scheme, data compressed according to the block compression scheme, data compressed according to the EAC scheme, or data compressed according to the ASTC scheme. For example, the image processing apparatus 100 decodes image data encoded according to the ETC scheme, image data compressed according to the block compression scheme, image data compressed according to the EAC scheme, or image data compressed according to the ASTC scheme.

The decoder 120 decodes encoding units from a bitstream received by the receiver 110. For example, the decoder 120 decodes a first encoding unit and a second encoding unit from the bitstream. The decoder 120 acquires one or more parameters from the first encoding unit, and decodes the first encoding unit using one or more first parameters that are the one or more parameters acquired from the first encoding unit. In another example, the decoder 120 acquires one or more parameters from the second encoding unit, and decodes the second encoding unit using one or more second parameters that are the one or more parameters acquired from the second encoding unit. In another example, the decoder 120 acquires one or more parameters from the first encoding unit, and decodes the second encoding unit using one or more first parameters that are the one or more parameters acquired from the first encoding unit.

When decoding of the second encoding unit is performed after decoding of the first encoding unit, decoding of the second encoding unit may be performed using the one or more first parameters that are the one or more parameters acquired from the first encoding unit. In this case, the one or more first parameters may be stored in a memory disposed inside or outside of the image processing apparatus 100.

Several types of parameters may be used in decoding an encoding unit. Examples of the parameters include a reference value for decoding of the encoding unit, a weight value used for interpolation using the reference value to determine one or more sample values, an index indicating one of the one or more sample values acquired as a result of the interpolation using the reference value and the weight value, and at least one sample value that is an object for determination of a pixel value.

Hereinafter, the reference value used when the decoder 120 decodes the first encoding unit in one example will be referred to as a first reference value. The weight value used when the decoder 120 performs interpolation using the first reference value to determine one or more sample values will be referred to as a first weight value. The index indicating one of the one or more sample values acquired as a result of interpolation using the first reference value and the first weight value will be referred to as a first index. Also, a result acquired by performing interpolation using the first reference value and the first weight value will be referred to as a first interpolation result, and at least one sample value acquired as the first interpolation result will be referred to as a first sample value.

Hereinafter, the reference value used when the decoder 120 decodes the second encoding unit in another example will be referred to as a second reference value. The weight value used when the decoder 120 performs interpolation using the second reference value to determine one or more sample values will be referred to as a second weight value. The index indicating one of the one or more sample values acquired as a result of interpolation using the second reference value and the second weight value will be referred to as a second index. Also, a result acquired by performing interpolation using the second reference value and the second weight value will be referred to as a second interpolation value, and at least one sample value acquired as the second interpolation result will be referred to as a second sample value.

A method of decoding the first encoding unit in the decoder 120 in one example will be described below. The decoder 120 receives data for the first encoding unit from the receiver 110. The decoder 120 acquires a first reference value used for decoding the first encoding unit, a first weight value used for interpolation using the first reference value to determine one or more sample values, and one or more first indexes indicating one of the one or more sample values from the data received from the receiver 110. Also, the decoder 120 decodes the first encoding unit using the first reference value, the first weight value, and the first index. For example, the decoder 120 performs interpolation using the first reference value and the first weight value, and decodes the first encoding unit using a first interpolation result acquired as a result of the interpolation using the first reference value and the first weight value, and the first index.

An example in which the decoder 120 decodes the first encoding unit using the first interpolation result and the first index will be described below. The decoder 120 acquires the first interpolation result by performing interpolation using the first reference value and the first weight value. The interpolation result indicates one or more sample values. For example, when the first reference value is 100 and the first weight values are 10 and 20, the one or more sample values are 110, which is acquired by adding 100 and 10, and 120, which is acquired by adding 100 and 20. In this case, when the first index is 1, the decoder 120 determines 110 of the two sample values of 110 and 120 to be a pixel value. In another example, when the first reference value is 200 and the first weight values are 10, 20, and 30, one or more sample values are 210, which is acquired by adding 200 and 10, 220, which is acquired by adding 200 and 20, and 230, which is acquired by adding 200 and 30. In this case, when a first index indicating a first pixel is 1 and a first index indicating a second pixel is 2, the decoder 120 determines 210 to be a pixel value of the first pixel and 220 to be a pixel value of the second pixel. In another example, when the first reference values are 100 and 200 and the first weight values are 0.3 and 0.6, one or more sample values are 170, which is acquired by performing interpolation between 100 and 200 by a weight value of 0.3, and 140, which is acquired by performing interpolation between 100 and 200 by a weight value of 0.6. In this case, when the first index is 1, the decoder 120 determines 140 of the two sample values of 140 and 170 to be a pixel value. The decoder 120 performs interpolation according to a predetermined scheme. For example, when reference values for a predetermined encoding unit are a first value and a second value, and a weight value is a third value, a sample value for the predetermined encoding unit is determined to be "first value×third value+ second value×(1−third value)".

The decoder 120 compares one or more parameters for the first encoding unit with one or more parameters for the second encoding unit, and decodes the first encoding unit or the second encoding unit.

For example, when decoding of the first encoding unit is performed before decoding of the second encoding unit, it is possible to respectively compare the first reference value, the first weight value, and the first index with the second reference value, the second weight value, and the second index, and decode the second encoding unit from the bitstream received from the receiver 110 using a first interpolation result according to a result of the comparison.

When the first reference value, the first weight value, and the first index are respectively identical to the second reference value, the second weight value, and the second index, the decoder 120 determines a result of decoding of the first encoding unit to be a result of decoding of the second encoding unit. For example, when the first encoding unit is identical to the second encoding unit, the decoder 120 uses data resulting from decoding of the first encoding unit as data resulting from decoding of the second encoding unit without decoding the second encoding unit.

Various methods may be used to determine whether to use data resulting from decoding of the first encoding unit as data resulting from decoding of the second encoding unit. Alternatively, various methods may be used for the decoder 120 to determine whether to use a result of decoding of the first encoding unit as a result of decoding of the second encoding unit.

In one example, when a portion corresponding to the first encoding unit is identical to a portion corresponding to the second encoding unit in the bitstream, the decoder 120 used data resulting from decoding of the first encoding unit as data resulting from decoding of the second encoding unit.

In another example, when the first reference value, the first weight value, and the first index acquired from the bitstream are respectively identical to the second reference value, the second weight value, and the second index acquired from the bitstream, the decoder uses data resulting from decoding of the first encoding unit as data resulting from decoding of the second encoding unit.

In another example, the decoder 120 acquires a first code value that is a preset code value indicating the first encoding unit and a second code value that is a preset code value indicating the second encoding unit from the bitstream. When the first code value corresponds to the second code value according to a preset method, the decoder 120 uses data resulting from decoding of the first encoding unit as data resulting from decoding of the second encoding unit. For example, the decoder 120 compares first tag information indicating the first encoding unit with second tag information indicating the second encoding unit and determines whether the first encoding unit is identical to the second encoding unit based on a result of the comparison. When it is determined that the first encoding unit is identical to the second encoding unit based on a result of the comparison of the first tag information and the second tag information, the decoder 120 determines a result of decoding of the first encoding unit to be a result of decoding of the second encoding unit.

In one example, when the first reference value and the first weight value are respectively identical to the second reference value and the second weight value, but the first index is different from the second index, the decoder 120 decodes the second encoding unit using the first interpolation result and the second index. In another example, the decoder 120 decodes the second encoding unit using the first sample value and the second index.

For example, when the first sample values acquired as the first interpolation result are 100, 150, 200, and 250, a second index for a first pixel is 1, a second index for a second pixel is 4, and a second index for a third pixel is 3, the decoder 120 determines a value of the first pixel to be 100, a value of the second pixel to be 250, and a value of the third pixel to be 200.

When the first reference value and the first weight value are not identical to the second reference value and the second weight value, that is, when the first reference value is not identical to the second reference value or the first weight value is not identical to the second weight value, the decoder 120 decodes the second encoding unit using a result for calculation for portions in which the first reference value and the first weight value are different from the second reference value and the second weight value. The decoder 120 decodes the second encoding unit by combining the first interpolation result with the result of calculation for the portions in which the first reference value and the first weight value are different from the second reference value and the second weight value according to a preset method.

For example, when the first reference value is not identical to the second reference value or the first weight value is not identical to the second weight value, the decoder 120 decodes the second encoding unit using a reference difference value that is a difference value between the first reference value and the second reference value, and a weight difference value that is a difference value between the first weight value and the second weight value. The decoder 120 acquires a reference calculation result that is a result of calculation using the reference difference value and a weight calculation result that is a result of calculation using the weight difference value, and decodes the second encoding unit using the first interpolation result, the reference calculation result, and the weight calculation result.

In another example, when the most significant bits of the first reference value are identical to those of the second reference value but the least significant bits of the first reference value are different from those of the second reference value, and the most significant bits of the first weight value are identical to those of the second weight value, but the least significant bits of the first weight value are different from those of the second weight value, the decoder 120 decodes the second encoding unit using a result of calculation between the most significant bits of the first reference value and the most significant bits of the first weight value and a result of calculation between the least significant bits of the second reference value and the least significant bits of the second weight value. A case in which the least significant bits of the first reference value or the first weight value are partially different from the least significant bits of the second reference value or the second weight value will now be described. For example, when the first reference value and the second reference value are respectively 10100001 and 10100100, and the first weight value and the second weight value are respectively 01010001 and 01010010, a value acquired by adding the first reference value and the first weight value is 11110010 and a value acquired by adding the second reference value and the second weight value is 11110110. In this case, when comparisons are respectively performed on the four most significant bits and the four least significant bits, the four most significant bits of the first reference value are identical to those of the second reference value, and the four most significant bits of the first weight value are identical to those of the second weight value. Therefore, the value acquired by adding the first reference value and the first weight value is different from the value acquired by adding the second reference value and the second weight value in the least significant bits. Assuming that the value acquired by adding the first reference value and the first weight value is a first interpolation result and the value acquired by adding the second reference value and the second weight value is a second interpolation result, the decoder 120 acquires the second interpolation result without performing a calculation to add the most significant bits of the second reference value and the most significant bits of the second weight value by combining the most significant bits of the first interpolation result with the value acquired by adding the least significant bits of the second reference value and the least significant bits of the second weight value.

Figure 2:
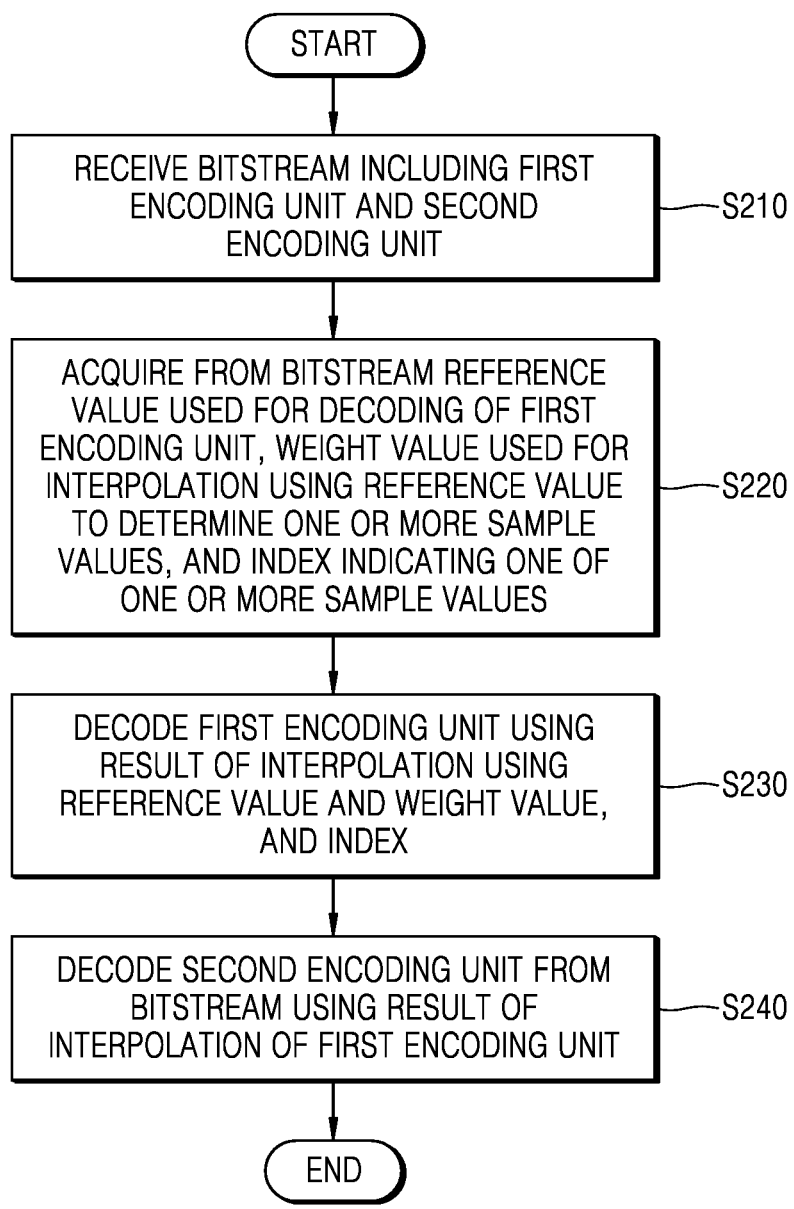
FIG. 2 is a flowchart of an example of a method of performing image decoding in an image processing apparatus.

FIG. 2 is a flowchart of an example of a method of performing image decoding in the image processing apparatus 100.

In operation S210, the image processing apparatus 100 receives a bitstream including a first encoding unit and a second encoding unit.

For example, the image processing apparatus 100 receives a bitstream from the outside of the image processing apparatus 100 in a wired manner or a wireless manner.

The bitstream includes data acquired by encoding an image that is an object to be decoded by the image processing apparatus 100.

In one example, the bitstream includes the first encoding unit and the second encoding unit. For example, data of the first encoding unit and the second encoding unit of a plurality of encoding units may be included in the bitstream.

The encoding unit is a pixel, a block, or a frame. In one example, the encoding unit is encoded according to an ETC scheme.

In operation S220, the image processing apparatus 100 acquires from the bitstream a reference value used for decoding of the first encoding unit, a weight value used for interpolation using the reference value to determine one or more sample values, and an index indicating one of the one or more sample values.

In one example, the first encoding unit is encoded using a first reference value, a first weight value, and a first index.

Also, the first encoding unit may be decoded using the first reference value, the first weight value, and the first index.

The bitstream received by the image processing apparatus 100 includes include data on the first reference value, the first weight value, and the first index. Also, the image processing apparatus 100 acquires the first reference value, the first weight value, and the first index by parsing the received bitstream.

The second encoding unit is encoded using a second reference value, a second weight value, and a second index. Also, the second encoding unit may be decoded using the second reference value, the second weight value, and the second index.

The bitstream received by the image processing apparatus 100 includes data on the second reference value, the second weight value, and second first index. Also, the image processing apparatus 100 acquires the second reference value, the second weight value, and the second index by parsing the received bitstream.

In operation S230, the image processing apparatus 100 decodes the first encoding unit using a result of interpolation using the reference value and the weight value, and the index.

Specifically, the image processing apparatus 100 acquires a first interpolation result by performing interpolation using the first reference value and the first weight value, acquires first sample values that are one or more sample values according to the first interpolation result, and determines one of the first sample values that is indicated by the first index to be a pixel value of a pixel that is an object to be decoded.

For example, the image processing apparatus 100 determines the one of the first sample values that is indicated by the first index to be a pixel value of a predetermined pixel included in the first encoding unit.

In operation S240, the image processing apparatus 100 decodes the second encoding unit from the bitstream using a result of interpolation of the first encoding unit.

The image processing apparatus 100 determines one of the first sample values acquired in operation S230 that is indicated by the second index to be a pixel value of a pixel that is an object to be decoded.

For example, the image processing apparatus 100 determines the one of the first sample values that is indicated by the second index to be a pixel value of a predetermined pixel included in the second encoding unit. The image processing apparatus 100 uses a result of interpolation of the first encoding unit to decode the second encoding unit, and therefore decodes the second encoding unit using the second index that is an index of the second encoding unit and the first sample value acquired as a result of interpolation of the first encoding unit without performing interpolation of the second encoding unit.

Figure 3:
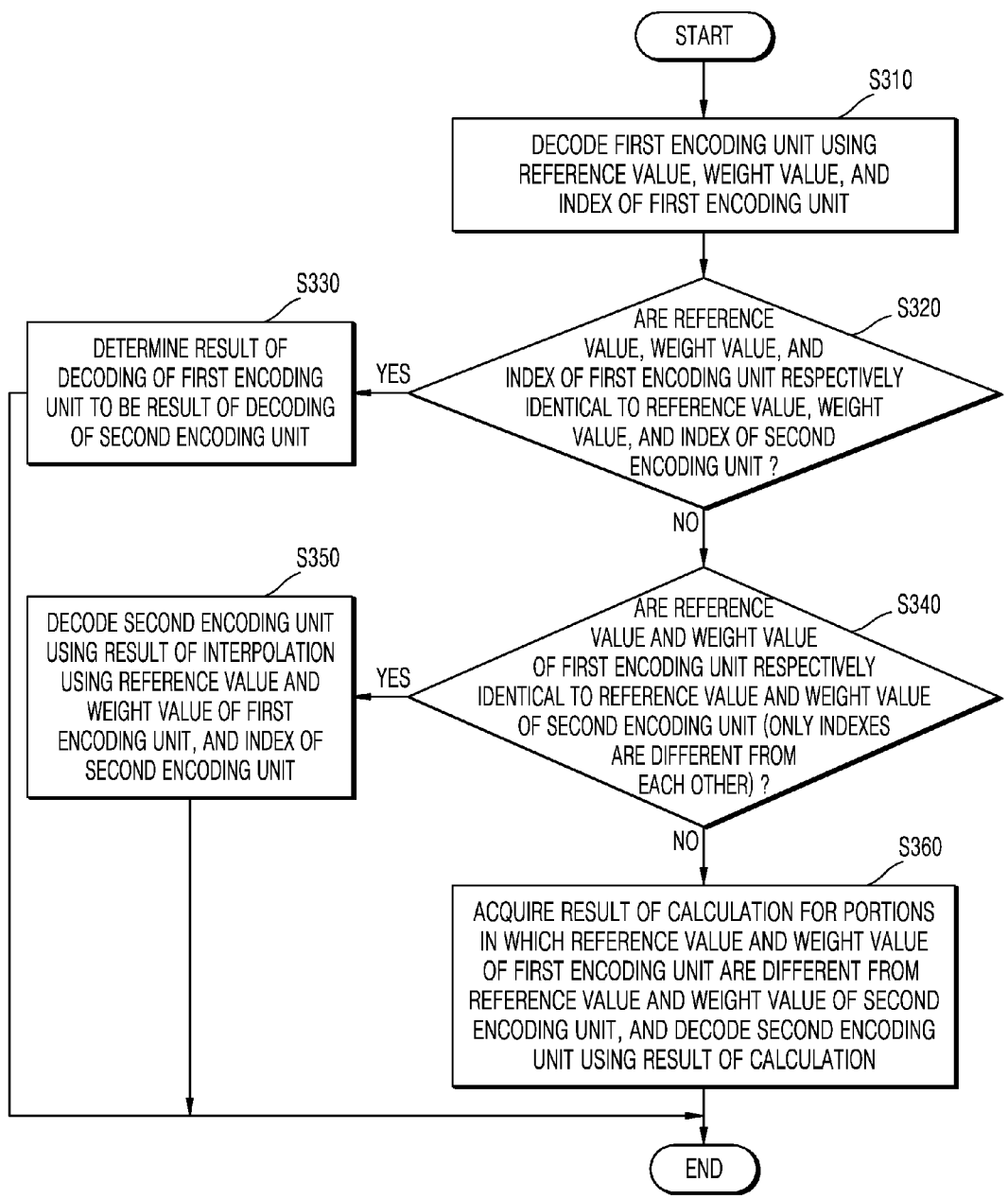
FIG. 3 is a flowchart of an example of a method of performing decoding of a first encoding unit and a second encoding unit in an image processing apparatus.

FIG. 3 is a flowchart of an example of a method of performing decoding of a first encoding unit and a second encoding unit in the image processing apparatus 100.

In operation S310, the image processing apparatus 100 decodes a first encoding unit using a reference value, a weight value, and an index of the first encoding unit.

The image processing apparatus 100 receives a bitstream including the first encoding unit. For example, the image processing apparatus 100 receives the bitstream including the first encoding unit from the outside of the image processing apparatus 100 in a wired manner or a wireless manner. The first encoding unit is inserted into the bitstream after the first encoding unit has been encoded. In one example, the first encoding unit is encoded according to the ETC scheme.

The image processing apparatus 100 acquires from the bitstream a first reference value used for decoding of the first encoding unit, a first weight value used for interpolation using the first reference value to determine one or more samples, and a first index indicating one of the first sample values acquired by performing interpolation using the first reference value and the first weight value.

The bitstream received by the image processing apparatus 100 includes data on the first reference value, the first weight value, and the first index. The bitstream received by the image processing apparatus 100 may not include the first sample value. In this case, the image processing apparatus 100 acquires the first sample value by using the first reference value and the first weight value to perform interpolation to acquire the first sample value. The image processing apparatus 100 acquires the first reference value, the first weight value, and the first index by parsing the received bitstream.

Specifically, the image processing apparatus 100 acquires a first interpolation result by performing interpolation using the first reference value and the first weight value, acquires first sample values that are one or more sample values according to the first interpolation result, and determine one of the first sample values indicated by the first index to be a pixel value of a pixel that is an object to be decoded.

For example, the image processing apparatus 100 determines the one of the first sample values indicated by the first index to be a pixel value of a predetermined pixel included in the first encoding unit.

The image processing apparatus 100 decodes the first encoding unit using the first reference value, the first weight value, and the first index. The image processing apparatus 100 decodes the first encoding unit using a first interpolation result and the first index. The image processing apparatus 100 decodes the first encoding unit using the first sample value and the first index.

In operation S320, the image processing apparatus 100 determines whether the reference value, the weight value, and the index of the first encoding unit are respectively identical to the reference value, the weight value, and the index of the second encoding unit to determine whether the first encoding unit is identical to the second encoding unit.

In one example, the image processing apparatus 100 determines whether the first encoding unit is identical to the second encoding unit.

In another example, the image processing apparatus 100 determines whether a portion corresponding to the first encoding unit is identical to a portion corresponding to the second encoding unit in the bitstream.

In one example, the image processing apparatus 100 compares one or more parameters for the first encoding unit with one or more parameters for the second encoding unit, and determines whether the first encoding unit is identical to the second encoding unit based on a result of the comparison.

The image processing apparatus 100 determines whether the first reference value, the first weight value, and the first index that are parameters of the first encoding unit are respectively identical to the second reference value, the second weight value, and the second index that are parameters of the second encoding unit. When the three parameters of the first encoding unit are identical to the three parameters of the second encoding unit, the image processing apparatus 100 determines that the first encoding unit is identical to the second encoding unit.

In another example, the image processing apparatus 100 acquires a first code value that is a preset code value indicating the first encoding unit and a second code value that is a preset code value indicating the second encoding unit from the bitstream. When the first code value corresponds to the second code value according to a preset method, the image processing apparatus 100 determines that the first encoding unit is identical to the second encoding unit. For example, the decoder 120 may compare first tag information indicating the first encoding unit with second tag information indicating the second encoding unit, and determine whether the first encoding unit is identical to the second encoding unit based on a result of the comparison.

Also, the image processing apparatus 100 acquires a second reference value that is a reference value of the second encoding unit, a second weight value that is a weight value of the second encoding unit, and a second index that is an index of the second encoding unit to compare reference values, weight values, and indexes of the first encoding unit and the second encoding unit.

In operation S330, the image processing apparatus 100 determines a result of decoding of the first encoding unit to be a result of decoding of the second encoding unit.

In this case, image processing apparatus 100 uses data resulting from decoding of the first encoding unit as data resulting from decoding of the second encoding unit without decoding the second encoding unit. For example, a pixel value acquired by performing decoding of the first encoding unit is used as a pixel value of a pixel in a portion to which the second encoding unit is applied.

In operation S340, the image processing apparatus 100 determines whether the reference value and the weight value of the first encoding unit are respectively identical to the reference value and the weight value of the second encoding unit. Alternatively, the image processing apparatus 100 determines whether only the first index of the first encoding unit is different from the second index of the second encoding unit among the reference value, the weight value, and the index that are parameters of the first encoding unit and the second encoding unit.

Thus, in operation S340, the image processing apparatus 100 determines whether the first reference value is identical to the second reference value, the first weight value is identical to the second weight value, and only the first index is different from the second index.

In operation S350, the image processing apparatus 100 decodes the second encoding unit using a result of interpolation using the reference value and the weight value of the first encoding unit, and the index of the second encoding unit.

In one example, the image processing apparatus 100 decodes the second encoding unit using the first interpolation result and the second index. In another example, the image processing apparatus 100 decodes the second encoding unit using the first sample value and the second index.

For example, when the first sample values acquired as the first interpolation result are 100, 150, 200, and 250, a second index for a first pixel is 1, a second index for a second pixel is 4, and a second index for a third pixel is 3, a value of the first pixel is 100, a value of the second pixel is 250, and a value of the third pixel is 200.

In this case, the image processing apparatus 100 decodes the second encoding unit without performing interpolation of the second encoding unit.

In operation S360, the image processing apparatus 100 acquires a result of calculation for portions in which the reference value and the weight value of the first encoding unit are different from the reference value and the weight value of the second encoding unit, and decode the second encoding unit using the acquired result of calculation.

The image processing apparatus 100 decodes the second encoding unit using the result of calculation for the portions in which the first reference value and the first weight value are different from the second reference value and the second weight value. The image processing apparatus 100 decodes the second encoding unit by combining the first interpolation result with the result of calculation for the portions in which the first reference value and the first weight value are different from the second reference value and the second weight value according to a preset method.

For example, when the first reference value is not identical to the second reference value or the first weight value is not identical to the second weight value, the image processing apparatus 100 decodes the second encoding unit using a reference difference value that is a difference value between the first reference value and the second reference value, and a weight difference value that is a difference value between the first weight value and the second weight value. The image processing apparatus 100 acquires a reference calculation result that is a result of calculation using the reference difference value and a weight calculation result that is a result of calculation using the weight difference value, and decodes the second encoding unit using the reference calculation result and the weight calculation result.

In another example, when the most significant bits of the first reference value are identical to those of the second reference value but the least significant bits of the first reference value are different from those of the second reference value, and the most significant bits of the first weight value are identical to those of the second weight value, but the least significant bits of the first weight value are different from those of the second weight value, the image processing apparatus 100 decodes the second encoding unit using a result of calculation between the most significant bits of the first reference value and the most significant bits of the first weight value and a result of calculation between the least significant bits of the second reference value and the least significant bits of the second weight value. A case in which the least significant bits of the first reference value or the first weight value are partially different from the least significant bits of the second reference value or the second weight value. For example, when the first reference value and the second reference value are respectively 10100001 and 10100100 and the first weight value and the second weight value are respectively 01010001 and 01010010, a value acquired by adding the first reference value and the first weight value is 11110010 and a value acquired by adding the second reference value and the second weight value is 11110110. In this case, when comparisons are respectively performed on the four most significant bits and the four least significant bits, the four most significant bits of the first reference value are identical to those of the second reference value, and the four most significant bits of the first weight value are identical to those of the second weight value. Therefore, the value acquired by adding the first reference value and the first weight value is different from the value acquired by adding the second reference value and the second weight value in the least significant bits. Assuming that the value acquired by adding the first reference value and the first weight value is a first interpolation result and the value acquired by adding the second reference value and the second weight value is a second interpolation result, the image processing apparatus 100 acquires the second interpolation result without performing a calculation to add the most significant bits of the second reference value and the most significant bits of the second weight value by combining the most significant bits of the first interpolation result with the value acquired by adding the least significant bits of the second reference value and the least significant bits of the second weight value.

Figure 4:
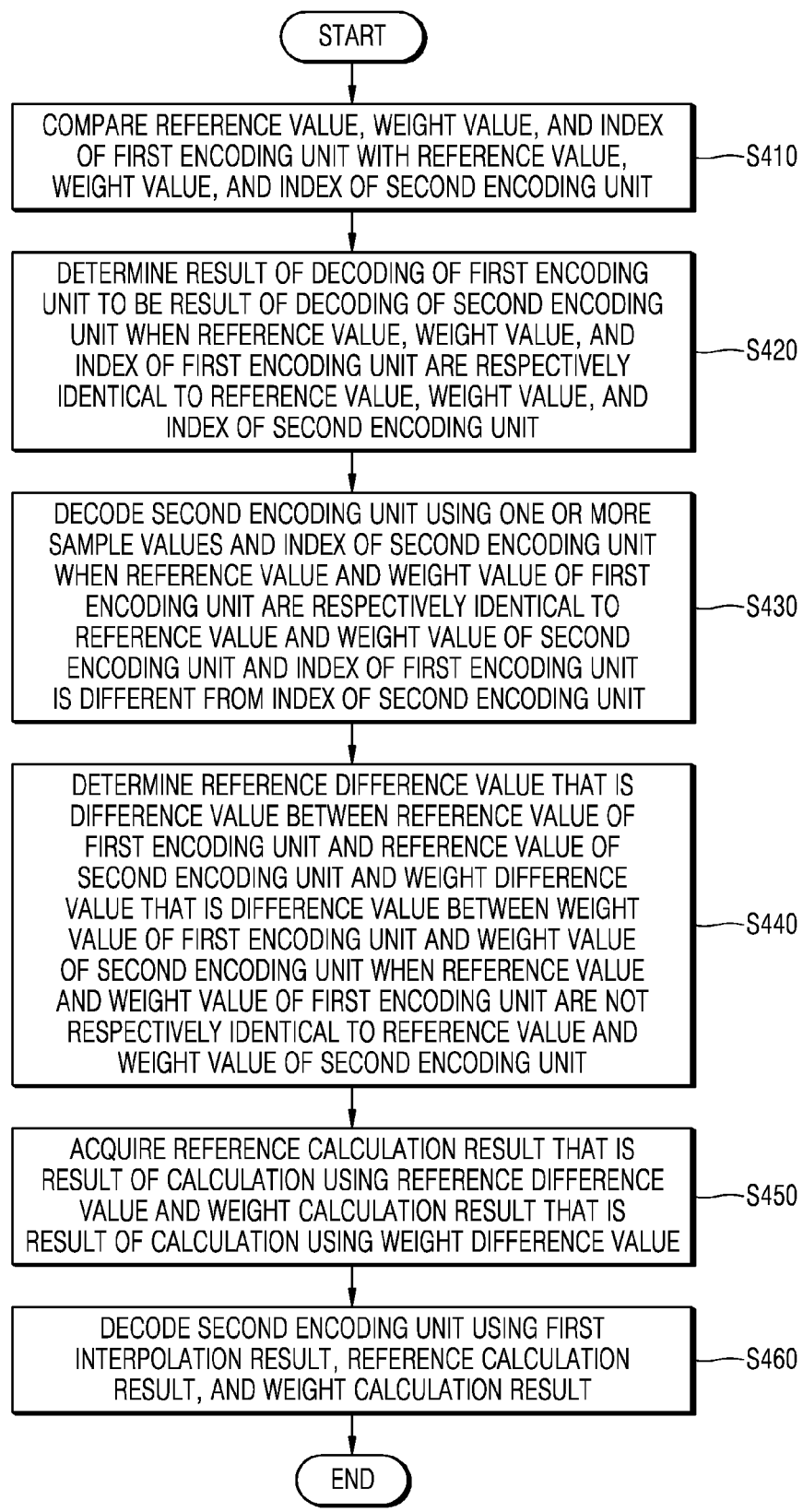
FIG. 4 is a flowchart of an example of a method of decoding a second encoding unit using a parameter of a first encoding unit in an image processing apparatus.

FIG. 4 is a flowchart of an example of a method of decoding a second encoding unit using a parameter of a first encoding unit in the image processing apparatus 100.

In operation S410, the image processing apparatus 100 respectively compares a first reference value, a first weight value, and a first index of a first encoding unit with a second reference value, a second weight value, and a second index of a second encoding unit.

After respectively comparing the first reference value, the first weight value, and the first index of the first coding unit with the second reference value, the second weight value, and the second index of the second encoding unit, the image processing apparatus 100 determines i) whether the first reference value, the first weight value, and the first index are respectively identical to the second reference value, the second weight value, and the second index, ii) whether the first reference value and the first weight value are respectively identical to the second reference value and the second weight value and the first index is different from the second index, or iii) whether the first reference value and the first weight value are respectively different from the second reference value and the second weight value.

Operation S410 of the image processing apparatus 100 corresponds to operations S320 and S340 in FIG. 3.

In operation S420, when it is determined that the first reference value, the first weight value, and the first index are respectively identical to the second reference value, the second weight value, and the second index in operation S410, the image processing apparatus 100 determines a result of decoding of the first encoding unit to be a result of decoding of the second encoding unit.

For example, when the first encoding unit is identical to the second encoding unit, the decoder 120 uses data resulting from decoding of the first encoding unit as data resulting from decoding of the second encoding unit without decoding the second encoding unit.

Operation S420 of the image processing apparatus 100 corresponds to operation S330 in FIG. 3.

In operation S430, when the first reference value and the first weight value are respectively identical to the second reference value and the second weight value, and the first index is different from the second index, the image processing apparatus 100 decodes the second encoding unit using the first sample value and the second index.

In one example, when the first reference value and the first weight value are respectively identical to the second reference value and the second weight value, and the first index is different from the second index, the decoder 120 decodes the second encoding unit using the first interpolation result and the second index. In another example, the decoder 120 decodes the second encoding unit using the first sample value and the second index.

For example, when the first sample values acquired as the first interpolation result are 100, 150, 200, and 250, and a second index for a first pixel is 1, a second index for a second pixel is 4, and a second index for a third pixel is 3, a value of the first pixel is 100, a value of the second pixel is 250, and a value of the third pixel is 200.

Operation S430 of the image processing apparatus 100 corresponds to operation S350 in FIG. 3.

In operation S440, when the first reference value and the first weight value are not respectively identical to the second reference value and the second weight value, the image processing apparatus 100 determines a reference difference value that is a difference value between the first reference value and the second reference value, and a weight difference value that is a difference value between the first weight value and the second weight value.

When the first reference value is 10110011 and the second reference value is 10110001, the reference difference value is 00000010, which is acquired by subtracting the second reference value from the first reference value. In another example, when the first reference value is 10110001 and the second reference value is 10110011, the reference difference value is 00000010, which is the absolute value of a difference value between the first reference value and the second reference value.

In another example, the reference difference value is calculated when the most significant bits of the first reference value are identical to those of the second reference value, and the least significant bits of the first reference value are different from those of the second reference value.

When the first weight value is 10110011 and the second weight value is 10110001, the weight difference value may be 00000010, which is acquired by subtracting the second weight value from the first weight value. In another example, when the first weight value is 10110001 and the second weight value is 10110011, the weight difference value may be 00000010, which is the absolute value of a difference between the first weight value and the second weight value.

In another example, the weight difference value is calculated when the most significant bits of the first weight value are identical to those of the second weight value, and the least significant bits of the first weight value are different from those of the second weight value.

In operation S450, the image processing apparatus 100 acquires a reference calculation result that is a result of calculation using the reference difference value, and a weight calculation result that is a result of calculation using the weight difference value.

The reference calculation result is a result acquired by performing calculation using the reference difference value. For example, the image processing apparatus 100 acquires the reference calculation result by calculating a change in the first interpolation result that is caused by the reference difference value.

The weight calculation result is a result acquired by performing calculation using the weight difference value. For example, the image processing apparatus 100 acquires the weight calculation result by calculating a change in the first interpolation result that is caused by the weight difference value.

In another example, the image processing apparatus 100 acquires an interpolation result corresponding to the reference difference value or the weight difference value as the reference calculation result or the weight calculation result.

In operation S460, the image processing apparatus 100 decodes the second encoding unit using the reference calculation result and the weight calculation result acquired in operation S450 and the first interpolation result.

For example, the image processing apparatus 100 acquires a second interpolation result by combining the reference calculation result and/or the weight calculation result acquired in operation S450 with the first interpolation result. For example, when the most significant bits of the first interpolation result are identical to the most significant bits of the second interpolation result, and the least significant bits of the first interpolation result are different from the least significant bits of the second interpolation result, the image processing apparatus 100 acquires the most significant bits of the second interpolation result by using the most significant bits of the first interpolation result as they are, and acquires the least significant bits of the second interpolation result from the reference calculation result and/or the weight calculation result, leading to acquirement of the second interpolation result.

In another example, the image processing apparatus 100 acquires an interpolation difference value that is a difference value between the first interpolation result and the second interpolation result using the reference calculation result and/or the weight calculation result acquired in operation S450. The image processing apparatus 100 acquires the second interpolation result by performing a calculation between the acquired interpolation difference value and the first interpolation result. In one example, the second interpolation result is acquired by adding the interpolation difference value and the first interpolation result.

Operations S440, S450, and S460 of the image processing apparatus 100 correspond to operation S360 in FIG. 3.

Figure 5:
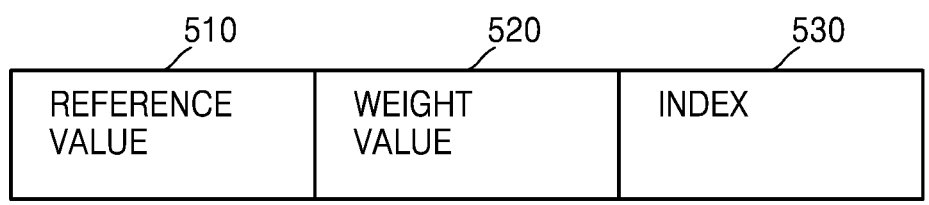
FIG. 5 is a diagram illustrating an example of a bitstream received by an image processing apparatus.

FIG. 5 is a diagram illustrating an example of the bitstream received by the image processing apparatus 100.

The bitstream received by the image processing apparatus 100 includes a reference value 510, a weight value 520, and an index 530 of an encoding unit.

The reference value 510, the weight value 520, and the index 530 are respectively inserted at preset positions in the bitstream. In one example, the reference value 510 is expressed by the leftmost eight bits, the weight value 520 is expressed by the central eight bits, and the index 530 is expressed by the rightmost eight bits. The image processing apparatus 100 acquires the reference value 510, the weight value 520, and the index 530 by parsing preset regions of the bitstream. A specific example of the bitstream will be described below with reference to FIG. 6.

FIG. 6 is a diagram illustrating another example of the bitstream received by the image processing apparatus 100.

The bitstream in this example includes respective reference values for red, green, and blue. Specifically, the bitstream includes red reference values 610 and 620, green reference values 630 and 640, and blue reference values 650 and 660.

The bitstream includes one or more reference values. In the example in FIG. 6, the bitstream includes a red reference value 1 (610), a red reference value 2 (620), a green reference value 1 (630), a green reference value 2 (640), a blue reference value 1 (650), and a blue reference value 2 (660).

When the bitstream includes one or more reference values for the same color, the image processing apparatus 100 divides a region of an encoding unit into a number of portions equal to the number of the reference values, and respectively applies the reference values to the portions. In another example, when the bitstream includes two reference values with respect to the same color, the image processing apparatus 100 decodes the same region using the two reference values.

The values are inserted in predetermined portions of the bitstream. For example, the red reference value 1 (610) is placed in an interval of 63-rd to 60-th bits, the red reference value 2 (620) is placed in an interval of 59-th to 56-th bits, the green reference value 1 (630) is placed in an interval of 55-th to 52-nd bits, the green reference value 2 (640) is placed in an interval of 51-st to 48-th bits, the blue reference value 1 (650) is placed in an interval of 47-th to 44-th bits, the blue reference value 2 (660) is placed in an interval of 43-rd to 40-th bits, the weight value 1 (670) is placed in an interval of 39-th to 37-th bits, the weight value 2 (680) is placed in an interval of 36-th to 34-th bits, the control bits 690 are placed in an interval of 33-rd to 32-nd bits, and the index 695 is placed in an interval of 31-st to 0-th bits.

Figure 7A:
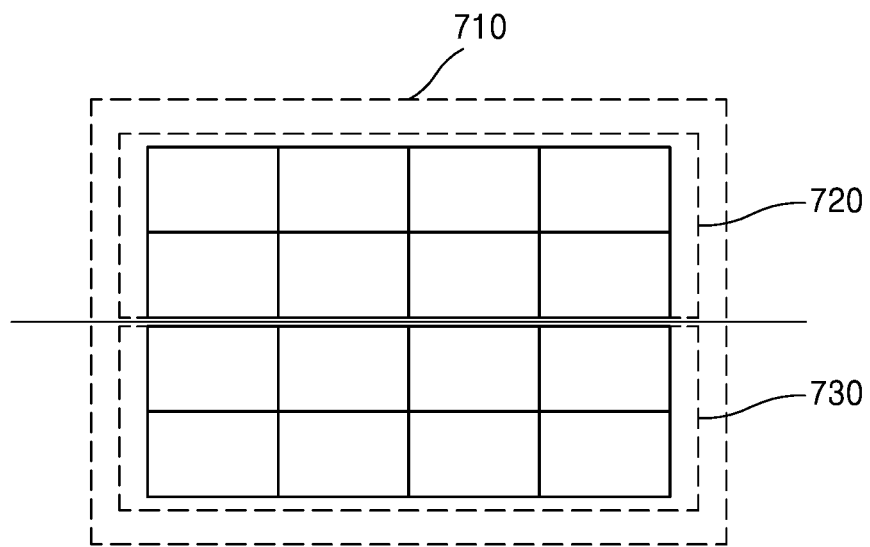
FIG. 7A is a diagram illustrating an example of an image to be decoded by an image processing apparatus.

FIG. 7A is a diagram illustrating an example of an image to be decoded by the image processing apparatus 100.

A encoding unit 710 includes an upper block 720 and a lower block 730. As described above with reference to FIG. 6, when the bitstream includes two reference values for the same color, the two reference values are respectively applied to the upper block 720 and the lower block 730. For example, the red reference value 1 (610) in FIG. 6 is used for decoding the upper block 720, and the red reference value 2 (620) in FIG. 6 is used for decoding the lower block 730.

The control bits 690 are used to determine whether to divide the encoding unit 710 vertically or horizontally.

Figure 7B:
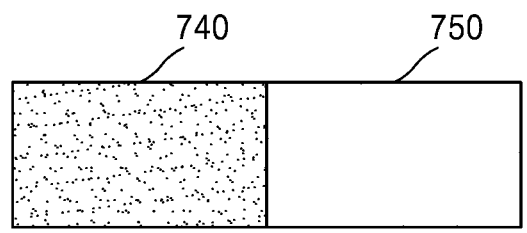
FIG. 7B is a diagram illustrating an example of reference values to be used for image decoding by an image processing apparatus.

FIG. 7B is a diagram illustrating an example of reference values to be used for image decoding by the image processing apparatus 100.

The image processing apparatus 100 decodes an encoding unit using a reference value 1 (740) and a reference value 2 (750).

For example, in the case of expressing green using numbers of 0 to 255, for example, the reference value 1 (740) may represent green corresponding to 255 and the reference value 2 (750) may represent green corresponding to 10.

Figure 7C:
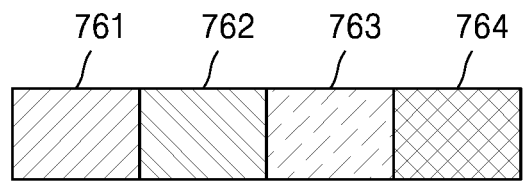
FIG. 7C is a diagram illustrating an example of weight values to be used for image decoding by an image processing apparatus.

FIG. 7C is a diagram illustrating an example of weight values to be used for image decoding by the image processing apparatus 100.

The image processing apparatus 100 decodes an encoding unit using a weight value 1 (761), a weight value 2 (762), a weight value 3 (763), and a weight value 4 (764).

For example, the weight value 1 (761), the weight value 2 (762), the weight value 3 (763), and the weight value 4 (764) may be respectively 10, 20, 30, and 40. The image processing apparatus 100 performs interpolation using the weight value 1 (761), the weight value 2 (762), the weight value 3 (763), the weight value 4 (764), and the reference value 1 (740) or the reference value 2 (750).

Figure 7D:
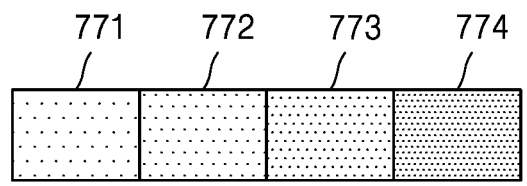
FIG. 7D is a diagram illustrating an example of sample values to be used for image decoding by an image processing apparatus.

FIG. 7D is a diagram illustrating an example of sample values to be used for image decoding by the image processing apparatus 100.

The image processing apparatus 100 decodes an encoding unit using a sample value 1 (771), a sample value 2 (772), a sample value 3 (773), and a sample value 4 (774).

The image processing apparatus 100 acquires a sample value by performing interpolation. For example, the image processing apparatus 100 acquires a sample value 1 (771) by adding the reference value 1 (740) and the weight value 1 (761), acquires a sample value 2 (772) by adding the reference value 1 (740) and the weight value 2 (762), acquires a sample value 3 (773) by adding the reference value 1 (740) and the weight value 3 (763), and acquires a sample value 4 (774) by adding the reference value 1 (740) and the weight value 4 (764).

Also, the image processing apparatus 100 uses a sample value of a plurality of sample values indicated by an index as a current pixel value.

Figure 8:
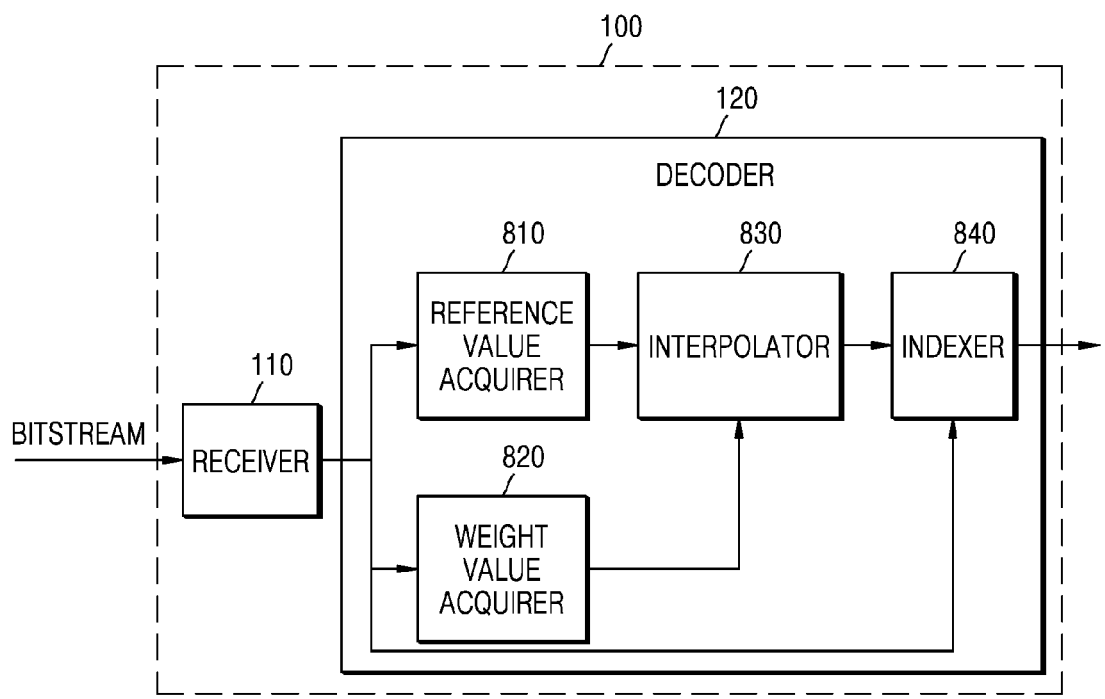
FIG. 8 is a block diagram illustrating an example of a configuration of an image processing apparatus.

FIG. 8 is a block diagram illustrating an example of a configuration of the image processing apparatus 100.

Referring to FIG. 8, the image processing apparatus 100 includes a receiver 110 and a decoder 120. The decoder 120 includes a reference value acquirer 810, a weight value acquirer 820, an interpolator 830, and an indexer 840.

The image processing apparatus 100 may be implemented by a larger or smaller number of elements than the number of elements illustrated in FIG. 8.

In FIG. 8, only elements related to this example are illustrated. Therefore, it will be apparent to one of ordinary skill in the art to which this example pertains that the image processing apparatus 100 may include other general-purpose elements in addition to the elements illustrated in FIG. 8.

Also, it will be apparent to one of ordinary skill in the art to which this example pertains that each of the receiver 110, the decoder 120, the reference value acquirer 810, the weight value acquirer 820, the interpolator 830, and the indexer 840 may be individually configured.

Since the receiver 110 and the decoder 120 have been described above with reference to FIG. 1, a detailed description thereof will be omitted for the sake of clarity.

The reference value acquiring device 810 acquires a reference value from a bitstream received by the receiver 110. For example, the reference value acquirer 810 acquires the reference value by parsing a portion of the bitstream at a preset position in the bitstream.

The weight value acquirer 820 acquires a weight value from the bitstream received by the receiver 110. For example, the weight value acquirer 820 acquires the weight value by parsing a portion of the bitstream at a preset position in the bitstream.

The interpolator 830 performs interpolation using the reference value acquired by the reference value acquirer 810 and the weight value acquired by the weight value acquirer 820 to acquire an interpolation result. The interpolation result includes one or more sample values. A method of performing interpolation is described above with reference to FIGS. 1 and 2.

The index 840 acquires an index from the bitstream received by the receiver 110. For example, the indexer 840 acquires the index by parsing a portion of the bitstream at a preset position in the bitstream. The indexer 840 decodes an encoding unit using the interpolation result acquired by the interpolator 830 and the index acquired from the bitstream. For example, the indexer 840 determines a sample value of the one or more sample values of the interpolation result indicated by the index to be a pixel value of a pixel to be decoded. A method of performing decoding is described above with reference to FIGS. 1 and 2.

The image processing apparatus 100, the receiver 110, and the decoder 120 illustrated in FIG. 1 and the image processing apparatus 100, the receiver 110, the decoder 120, the reference value acquirer 810, the weight value acquirer 820, the interpolator 830, and the indexer 840 illustrated in FIG. 8 that perform the operations described herein with respect to FIGS. 1-8 are implemented by hardware components. Examples of hardware components include controllers, sensors, generators, drivers, memories, comparators, arithmetic logic units, adders, subtractors, multipliers, dividers, integrators, and any other electronic components known to one of ordinary skill in the art. In one example, the hardware components are implemented by computing hardware, for example, by one or more processors or computers. A processor or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result. In one example, a processor or computer includes, or is connected to, one or more memories storing instructions or software that are executed by the processor or computer. Hardware components implemented by a processor or computer execute instructions or software, such as an operating system (OS) and one or more software applications that run on the OS, to perform the operations described herein with respect to FIGS. 1-8. The hardware components also access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 2-4 that perform the operations described herein with respect to FIGS. 1-8 are performed by computing hardware, for example, by one or more processors or computers, as described above executing instructions or software to perform the operations described herein.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An image processing method comprising:
    receiving a bitstream comprising a first encoding unit and a second encoding unit;
    acquiring from the bitstream a reference value for decoding of the first coding unit, a weight value for performing interpolation using the reference value to determine one or more sample values, and an index indicating one of the one or more sample values;
    decoding the first encoding unit using the index and a result of interpolation performed using the reference value and the weight value; and
    decoding the second encoding unit from the bitstream using the interpolation result used in the decoding of the first encoding unit.

2. The image processing method of claim 1, wherein the decoding of the second encoding unit from the bitstream comprises:
    comparing the reference value, the weight value, and the index of the first encoding unit with a reference value, a weight value, and an index of the second encoding unit; and
    decoding the second encoding unit from the bitstream using the interpolation result based on a result of the comparing.

3. The image processing method of claim 2, wherein the decoding of the second encoding unit from the bitstream using the interpolation result based on the result of the comparing comprises determining a result of the decoding of the first encoding unit to be a result of decoding of the second encoding unit in response to the result of the comparing being that the reference value, the weight value, and the index of the first encoding unit are identical to the reference value, the weight value, and the index of the second encoding unit.

4. The image processing method of claim 2, wherein the decoding of the second encoding unit from the bitstream using the interpolation result based on the result of the comparing includes comprises decoding the second encoding unit using the one or more sample values and the index of the second encoding unit in response to the result of the comparing being that the reference value and the weight value of the first encoding unit are respectively identical to the reference value and the weight value of the second encoding unit, and the index of the first encoding unit is different from the index of the second encoding unit.

5. The image processing method of claim 2, wherein the decoding of the second encoding unit from the bitstream using the interpolation result based on the result of the comparing comprises:
    determining a reference difference value that is a difference value between the reference value of the first encoding unit and the reference value of the second encoding unit and a weight difference value that is a difference value between the weight value of the first encoding unit and the weight value of the second encoding unit in response to the result of the comparing being that the reference value and the weight value of the first encoding unit are not respectively identical to the reference value and the weight value of the second encoding unit; and
    decoding the second encoding unit using the reference difference value and the weight difference value.

6. The image processing method of claim 5, wherein the decoding of the second encoding unit using the reference difference value and the weight difference value comprises:
    acquiring a reference calculation result that is a calculation result using the reference difference value and a weight calculation result that is a calculation result using the weight difference value; and
    decoding the second encoding unit using the interpolation result, the reference calculation result, and the weight calculation result.

7. The image processing method of claim 2, wherein the decoding of the second encoding unit from the bitstream using the interpolation result based on the result of the comparing comprises:
    acquiring a result of calculation for portions in which the reference value and the weight value of the first encoding unit are not respectively identical to the reference value and the weight value of the second encoding unit in response to the result of the comparing being that the reference value and the weight value of the first encoding unit are not respectively identical to the reference value and the weight value of the second encoding unit; and
    decoding the second encoding unit using the acquired result of calculation.

8. The image processing method of claim 1, wherein the decoding of the second encoding unit from the bitstream comprises:
    determining whether the first encoding unit is identical to the second encoding unit by comparing first tag information indicating the first encoding unit with second tag information indicating the second encoding unit; and
    determining a result of the decoding of the first encoding unit to be a result of decoding of the second encoding unit in response to a result of the determining being that the first encoding unit is identical to the second encoding unit.

9. The image processing method of claim 1, wherein each of the first encoding unit and the second encoding unit is a pixel, a block, or a frame.

10. The image processing method of claim 1, wherein each of the first encoding unit and the second encoding unit is encoded according to an Ericsson texture Compression (ETC) scheme.

11. A non-transitory computer-readable storage medium storing a instructions for causing computing hardware to perform the method of claim 1.

12. An image processing apparatus comprising:
a receiver configured to receive a bitstream comprising a first encoding unit and a second encoding unit; and
a decoder configured to:
acquire from the bitstream a reference value for decoding of the first coding unit, a weight value for performing interpolation using the reference value to determine one or more sample values, and an index indicating one of the one or more sample values;
decode the first encoding unit using the index and a result of interpolation performed using the reference value and the weight value; and
decode the second encoding unit from the bitstream using the interpolation result used in the decoding of the first encoding unit.

13. The image processing apparatus of claim 12, wherein the decoder is further configured to:
compare the reference value, the weight value, and the index of the first encoding unit with a reference value, a weight value, and an index of the second encoding unit; and
decode the second encoding unit from the bitstream using the interpolation result based on a result of the comparing.

14. The image processing apparatus of claim 13, wherein the decoder is further configured to determine a result of the decoding of the first encoding unit to be a result of decoding of the second encoding unit in response to the result of the comparing being that the reference value, the weight value, and the index of the first encoding unit are identical to the reference value, the weight value, and the index of the second encoding unit.

15. The image processing apparatus of claim 13, wherein the decoder is further configured to decode the second encoding unit using the one or more sample values and the index of the second encoding unit in response to the result of the comparing being that the reference value and the weight value of the first encoding unit are respectively identical to the reference value and the weight value of the second encoding unit, and the index of the first encoding unit is different from the index of the second encoding unit.

16. The image processing apparatus of claim 13, wherein the decoder is further configured to:
determine a reference difference value that is a difference value between the reference value of the first encoding unit and the reference value of the second encoding unit and a weight difference value that is a difference value between the weight value of the first encoding unit and the weight value of the second encoding unit in response to the result of the comparing being that the reference value and the weight value of the first encoding unit are not respectively identical to the reference value and the weight value of the second encoding unit; and
decode the second encoding unit using the reference difference value and the weight difference value.

17. The image processing apparatus of claim 16, wherein the decoder is further configured to:
acquire a reference calculation result that is a calculation result using the reference difference value, and a weight calculation result that is a calculation result using the weight difference value; and
decode the second encoding unit using the interpolation result, the reference calculation result, and the weight calculation result.

18. The image processing apparatus of claim 12, wherein the decoder is further configured to:
determine whether the first encoding unit is identical to the second encoding unit by comparing first tag information indicating the first encoding unit with second tag information indicating the second encoding unit; and
determine a result of the decoding of the first encoding unit to be a result of decoding of the second encoding unit in response to a result of the determining being that the first encoding unit is identical to the second encoding unit.

19. The image processing apparatus of claim 12, wherein each of the first encoding unit and the second encoding unit is a pixel, a block, or a frame.

20. The image processing apparatus of claim 12, wherein each of the first encoding unit and the second encoding unit is encoded according to an Ericsson Texture Compression (ETC) scheme.

21. An image processing apparatus comprising:
a receiver configured to receive a bitstream comprising a first encoding unit and a second encoding unit; and
a decoder configured to:
acquire from the bitstream first parameters for decoding the first encoding unit;
decode the first encoding unit by using some of the parameters to obtain an interim decoding result, and using another one of the parameters to obtain a final decoding result; and
decode the second encoding unit using the interim decoding result of the first encoding unit or the final decoding result of the first encoding unit.

22. The image processing apparatus of claim 21, wherein the decoder is further configured to:
acquire from the bitstream second parameters for decoding the second encoding unit;
determine whether the first parameters are identical to the second parameters; and
decode the second encoding unit using the interim decoding result of the first encoding unit or the final decoding result of the first encoding unit in response to a result of the determining.

23. The image processing apparatus of claim 22, wherein the decoder is further configured to determine the final decoding result of the first encoding unit to be a final decoding result of the second encoding unit in response to a result of the determining being that the first parameters are identical to the second parameters.

24. The image processing apparatus of claim 22, wherein the decoder is further configured to decode the second encoding unit using the interim decoding result of the first encoding unit and one of the parameters of the second encoding unit in response to a result of the determining being that some of the first parameters are identical to some of the second parameter, and one of the first parameters is not equal to one of the second parameters.

25. The image processing apparatus of claim 24, wherein the first parameters comprise a first reference value, a first weight value, and a first index;
the second parameters comprise a second reference value, a second weight value, and a second index;

the interim result of the first encoding unit is an interpolation result of the first encoding unit obtained by performing interpolation using the first reference value and the first weight value; and the decoder is further configured to decode the second encoding unit using the interpolation result of the first encoding unit and the second index in response to the result of the determining being that the first reference value is equal to the second reference value, the first weight value is equal to the second weight value, and the first index is not equal to the second index.

26. The image processing apparatus of claim 25, wherein the interpolation result comprises a plurality of samples;

the first index indicates one of the samples, and the second index indicates another one of the samples;

the sample indicated by the first index is the final decoding result of the first encoding unit; and the sample indicated by the second index is a final decoding result of the second encoding unit.

27. The image processing apparatus of claim 24, wherein the first parameters comprise a first reference value, a first weight value, and a first index;

the second parameters comprise a second reference value, a second weight value, and a second index;

the interim result of the first encoding unit is an interpolation result of the first encoding unit obtained by performing interpolation using the first reference value and the first weight value; and the decoder is further configured to decode the second encoding unit using the second index and most significant bits of the interpolation result of the first encoding unit combined with a calculation result of least significant bits of the second reference value and least significant bits of the second weight value in response to the result of the determining being that most significant bits of the first reference value are equal to most significant bits of the second reference value, least significant bits of the first reference value are not equal to the least significant bits of the second reference value, most significant bits of the first weight value are equal to most significant bits of the second weight value, least significant bits of the first weight value are not equal to the least significant bits of the second weight value, and the first index is not equal to the second index.

* * * * *